(12) United States Patent
Hergesheimer

(10) Patent No.: US 11,381,402 B2
(45) Date of Patent: Jul. 5, 2022

(54) SYSTEMS AND METHODS FOR SECURE COMMUNICATIONS IN VEHICLE TELEMATICS SYSTEMS

(71) Applicant: CalAmp Corp., Irvine, CA (US)

(72) Inventor: Peter Hergesheimer, Encinitas, CA (US)

(73) Assignee: CalAmp Corp., Irvine, CA (US)

( * ) Notice: Subject to any disclaimer, the term of this patent is extended or adjusted under 35 U.S.C. 154(b) by 0 days.

(21) Appl. No.: 15/931,034

(22) Filed: May 13, 2020

(65) Prior Publication Data

US 2021/0067346 A1 Mar. 4, 2021

Related U.S. Application Data

(63) Continuation of application No. 15/945,730, filed on Apr. 4, 2018, now abandoned.
(Continued)

(51) Int. Cl.
*H04L 9/32* (2006.01)
*H04L 9/08* (2006.01)
(Continued)

(52) U.S. Cl.
CPC .......... *H04L 9/3263* (2013.01); *H04L 9/0861* (2013.01); *H04L 9/0894* (2013.01); *H04L 9/321* (2013.01); *H04L 9/3247* (2013.01); *H04L 9/3271* (2013.01); *H04L 63/0428* (2013.01); *H04L 63/166* (2013.01); *H04W 4/14* (2013.01); *H04W 4/44* (2018.02); *H04W 12/009* (2019.01); *H04W 12/03* (2021.01); *H04W 12/041* (2021.01); *H04W 12/068* (2021.01);
(Continued)

(58) Field of Classification Search
CPC .... G07C 5/008; G10L 25/48; H04Q 2209/50; H04Q 9/00; H04L 2209/80; H04L 2209/84; H04L 63/0428; H04L 63/166; H04L 67/12; H04L 9/0861; H04L 9/0894; H04L 9/321; H04L 9/3247; H04L 9/3263; H04L 9/3271; H04W 12/001; H04W 12/009; H04W 12/0401; H04W 12/06; H04W 4/14; H04W 4/44
See application file for complete search history.

(56) References Cited

U.S. PATENT DOCUMENTS 8,489,271 B2 7/2013 Hergesheimer et al.
2008/0172306 A1* 7/2008 Schorr ................... G06Q 30/02
705/26.41
(Continued)

OTHER PUBLICATIONS

SAE International Surface Vehicle Recommended Practice, "E/E Diagnostic Test Modes," SAE Standard J1979, Issued Dec. 1, 1991, 19 pgs.
(Continued)

*Primary Examiner* — Mohammed Waliullah
(74) *Attorney, Agent, or Firm* — Barnes & Thornburg LLP

(57) ABSTRACT

A vehicle telematics system is provided having secure communication capabilities between a vehicle telematics device and external computing devices. In one embodiment, the vehicle telematics device includes a processor; a memory coupled to the processor and storing a vehicle telematics application; and a security chip coupled to the processor and the memory, wherein the security chip is configured to support a Transport Layer Security (TLS) stack.

12 Claims, 10 Drawing Sheets

Related U.S. Application Data

(60) Provisional application No. 62/481,437, filed on Apr. 4, 2017.

(51) Int. Cl.

| | | |
|---|---|---|
| *H04L 9/40* | (2022.01) | |
| *H04W 12/00* | (2021.01) | |
| *H04W 12/069* | (2021.01) | |
| *H04W 4/14* | (2009.01) | |
| *H04W 4/44* | (2018.01) | |
| *H04W 12/03* | (2021.01) | |
| *H04W 12/041* | (2021.01) | |
| *H04W 12/06* | (2021.01) | |
| *H04L 67/12* | (2022.01) | |

(52) U.S. Cl.
CPC .......... *H04W 12/069* (2021.01); *H04L 67/12* (2013.01); *H04L 2209/80* (2013.01); *H04L 2209/84* (2013.01)

(56) References Cited

U.S. PATENT DOCUMENTS

| | | | |
|---|---|---|---|
| 2009/0047929 A1* | 2/2009 | Chesnutt | H04L 51/38 455/411 |
| 2011/0105082 A1* | 5/2011 | Haley | H04M 1/72577 455/411 |
| 2011/0153121 A1* | 6/2011 | Minassian | B60R 25/24 701/2 |
| 2012/0028607 A1* | 2/2012 | Tengler | H04L 63/126 455/411 |
| 2014/0096217 A1* | 4/2014 | Lehmann | H04L 63/08 726/7 |
| 2014/0108787 A1* | 4/2014 | Ando | H04L 63/0823 713/156 |
| 2016/0104123 A1* | 4/2016 | Viswanath | G06Q 10/20 705/305 |
| 2016/0343178 A1* | 11/2016 | Lesesky | B60C 19/00 |
| 2016/0344704 A1* | 11/2016 | Stumpf | H04L 63/0428 |
| 2016/0344705 A1* | 11/2016 | Stumpf | G06F 21/57 |
| 2017/0142556 A1* | 5/2017 | Matus | H04W 76/10 |
| 2017/0214662 A1* | 7/2017 | Chu | H04L 63/0823 |
| 2017/0308075 A1* | 10/2017 | Whitaker | B60W 10/04 |
| 2018/0007038 A1* | 1/2018 | Hsu | H04L 63/0853 |
| 2018/0061230 A1* | 3/2018 | Madigan | B60W 50/14 |
| 2018/0091596 A1* | 3/2018 | Alvarez | H04L 9/3239 |

OTHER PUBLICATIONS

SAE International Surface Recommended Practice, "OBD II Scan Tool," SAE Standard J1978, Issued Mar. 1, 1992, 13 pgs.

* cited by examiner

| Threat Description | Risk Level | Mitigation |
|---|---|---|
| OTA Updates – not encrypted or signed | Critical | File auth added (L1 & L2) |
| OTA Updates – initiated without authentication | Critical | Msg auth added (L1 & L2) |
| CommSec – no end-to-end encryption | Critical | VT device data (existing L1) VT device and Server (L2) |
| Man-in-the-middle attack (GSM in particular) | Critical | Msg Auth, Encrypt, File Auth (L1 & L2) |
| SMS interface not authenticated – subject to MitM attacks | Critical | SMS auth added (L1 & L2) |
| DNS spoofing – sent to wrong server | High | Server auth (L2) |
| Information disclosure in Assisted GPS | High | Randomize GPS position in AGPS Request |

FIG. 9

SYSTEMS AND METHODS FOR SECURE COMMUNICATIONS IN VEHICLE TELEMATICS SYSTEMS

CROSS-REFERENCE TO RELATED APPLICATIONS

The current application is a continuation of U.S. patent application Ser. No. 15/945,730, filed Apr. 4, 2018, entitled "SYSTEMS AND METHODS FOR SECURE COMMUNICATIONS IN VEHICLE TELEMATICS SYSTEMS" to Peter Hergesheimer, which claims priority to U.S. Provisional Patent Application No. 62/481,437 entitled SYSTEMS AND METHODS FOR SECURE COMMUNICATIONS IN VEHICLE TELEMATICS SYSTEMS filed on Apr. 4, 2017 by inventor Peter Hergesheimer, the disclosures of which are hereby incorporated by reference in their entirety.

FIELD

The embodiments generally relate to secure data communication of data by wireless networks.

BACKGROUND

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

A Global Positioning System (GPS) is a space-based global navigation satellite system that utilizes a network of geo-synchronous satellites that can be utilized by a GPS receiver to determine its location. Many telematics systems incorporate a Global Positioning System (GPS) receiver that can be used to obtain the location of a vehicle at a certain measured time. Using the signals received by the GPS receiver, the heading information of the vehicle can be determined. A GPS receiver can determine velocity information in a variety of ways including, but not limited to, measuring the Doppler shift of the received signals and by comparing the location of a vehicle at a plurality of measured times. The acceleration of the vehicle can be determined as the change in speed divided by the time between the measurements. A GPS receiver's ability to determine acceleration can be limited due to the dependence of the measurement upon factors such as, but not limited to, reception and satellite availability. In addition to location information, a GPS receiver can also be configured to provide time data. However, measurements determined via a GPS receiver can contain errors that affect the accuracy of the measured information. In particular, GPS signals are vulnerable to signal delays, inconsistencies of atmospheric conditions that affect the speed of the GPS signals as they pass through Earth's atmosphere, and multipath distortions. Additionally, other factors not listed can influence GPS signals and result in measurement errors.

BRIEF SUMMARY

The embodiments are best summarized by the claims included herein. Briefly, systems and methods for secure communications in vehicle telematics systems in accordance with the embodiments are disclosed.

BRIEF DESCRIPTIONS OF THE DRAWINGS

FIG. 9 is a chart showing example mitigation techniques for various threat descriptions and corresponding security risk levels.

DETAILED DESCRIPTION

In the following detailed description of the embodiments, numerous specific details are set forth in order to provide a thorough understanding. However, it will be obvious to one skilled in the art that the embodiments may be practiced without these specific details. In other instances, well known methods, procedures, components, and circuits have not been described in detail so as not to unnecessarily obscure aspects of the embodiments.

The embodiments include a method, an apparatus, and a system for secure communications in vehicle telematics systems. Many vehicles are equipped with a telematics unit. These telematics units can obtain and/or measure a variety of data regarding the conditions and/or location of the vehicle along with receiving and transmitting data to remote server systems. In order to facilitate these communications, the telematics units can include a radio transceiver, such as a cellular modem, which can be utilized to communicate with the remote server systems. However, these radio transceivers require a data plan or other cellular service specifically dedicated to the telematics unit. Additionally, many telematics units are only compatible with one service provider (e.g. cellular service provider), thereby requiring different versions of the telematics unit for different geographic regions and limiting the ability of a particular telematics unit to be utilized in all locations in which a particular vehicle may travel.

In a variety of embodiments, the operational state of a vehicle is utilized to determine if a vehicle telematics device should transmit and/or receive data. In a number of embodiments, vehicle ignition state (i.e. the operational status of the vehicle) is ascertained by monitoring the vehicle for signs indicative of the vehicle ignition state without directly connecting to the vehicle ignition line. Information indicative of vehicle ignition state (i.e. vehicle status data) can be ascertained by observing characteristics of the vehicle including but not limited to the power supplied by the vehicle, vehicle vibration, communications on an OBD II port (e.g., on-board diagnostics connector) or other vehicle data bus line, and/or vehicle position information. In many embodiments, multiple different types of information are combined to ascertain the vehicle ignition state. Systems and methods for using an asset tracking device added to the vehicle after the manufacture of the vehicle without a direct connection to the vehicle ignition line that can be utilized to determine ignition state information in accordance with embodiments are described in U.S. Pat. No. 8,489,271, titled "Systems and Methods for Virtual Ignition Detection" and issued Jul. 16, 2013, the disclosure of which is hereby incorporated by reference in its entirety.

Systems and methods for radio access interfaces in accordance with embodiments are further described in more detail herein.

Vehicle Telematics Systems

Figure 1:
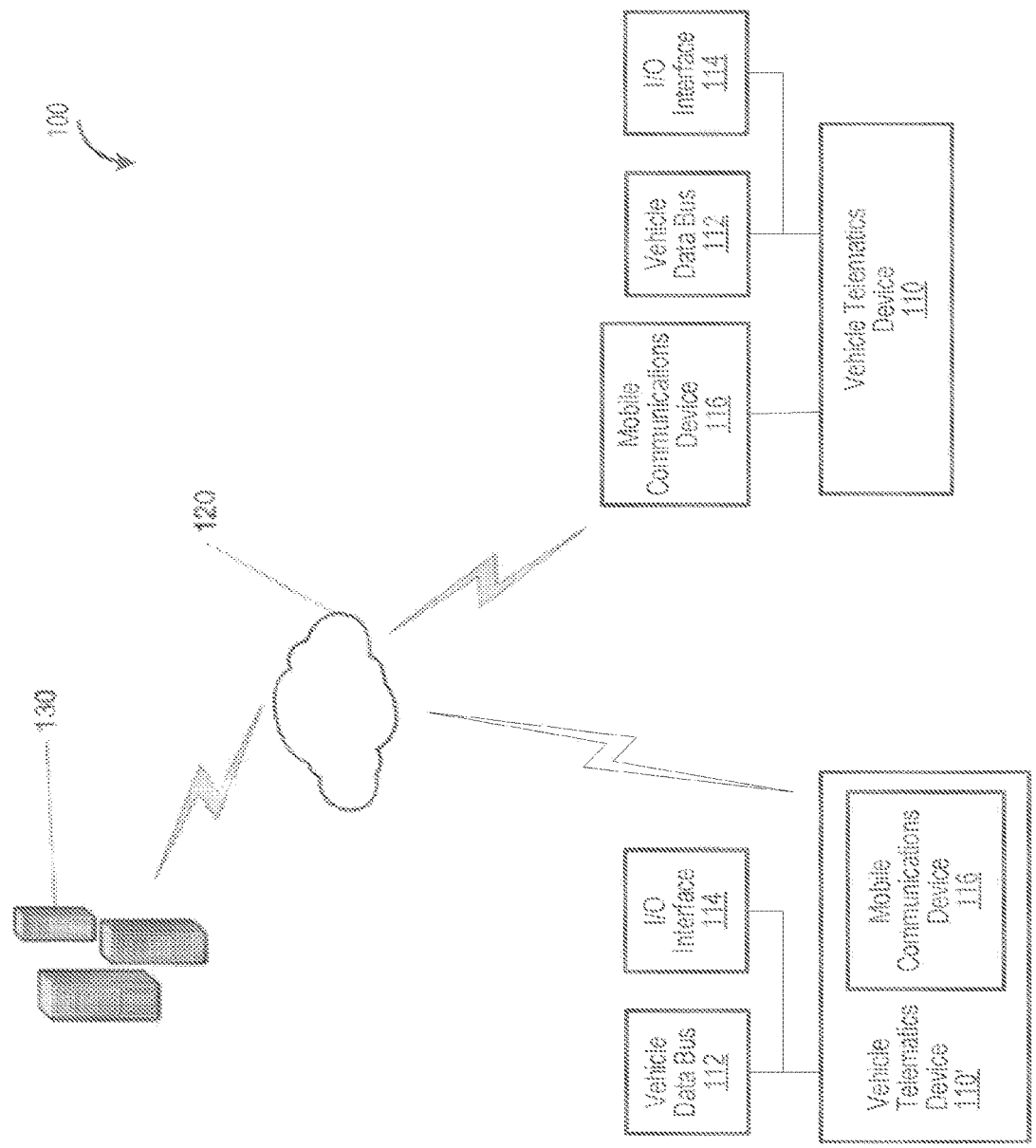
FIG. 1 is a conceptual illustration of a vehicle telematics system in accordance with an embodiment.

Vehicle telematics systems in accordance with embodiments can transmit a variety of data between a remote server system and a vehicle telematics device using a mobile communications device. A conceptual diagram of a vehicle telematics system 100 in accordance with an embodiment is shown in FIG. 1. The vehicle telematics system 100 includes one or more vehicle telematics devices (110, 110', etc.). The vehicle telematics device 110 can communicate with a mobile communications device 116, a vehicle data bus 112, and/or an input/output (I/O) interface 114 as appropriate to the requirements of specific applications of embodiments.

In a variety of embodiments, the mobile communications device 116 and/or the vehicle telematics device 110 communicates with the remote server system 130 via a network 120. The vehicle telematics device 110' may include the mobile communications device 116 to communicate to the remote server system 130 over the network 120. Otherwise, the vehicle telematics device 110 can be coupled in communication with the mobile communications device 116 in order for the vehicle telematics device 110 to communicate with the remote server system 130 over the network 120.

In a variety of embodiments, the network 120 is the Internet. In many embodiments, the network 120 is any wired or wireless network, such as a cellular network, between the vehicle telematics device 110' and/or the mobile communications device 116 and the remote server system 130. In a number of embodiments, the remote server system 130 is implemented using a single server system. In several embodiments, the remote server system 130 is implemented using multiple server systems.

In a variety of embodiments, the vehicle telematics device 110 is installed in a vehicle having a vehicle data bus 112. In several embodiments, the vehicle telematics device 110 is connected to a vehicle diagnostic connector that provides access to the vehicle data bus 112. The vehicle telematics device 110 can obtain data from any of a variety of vehicle devices connected to the vehicle data bus 112 utilizing any of a variety of techniques as appropriate to the requirements of specific applications of embodiments. Vehicle devices can include, but are not limited to, engine sensors, electronic control unit (ECU) devices, alternator sensors, vibration sensors, voltage sensors, oxygen sensors, Global Positioning System (GPS) receivers, ignition devices, weight sensors, wireless network devices, and/or acceleration determination devices. Systems and methods for connecting to a vehicle data bus that can be utilized in accordance with embodiments are described in SAE J1978, titled "OBD II Scan Tool," first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes," first published by SAE International on Dec. 1, 1991 and last updated Aug. 11, 2014. The disclosures of SAE J1978 and SAE J1979 are hereby incorporated by reference in their entirety. In a number of embodiments, the vehicle telematics device 110 is connected directly, either wired or wirelessly, to one or more sensors within the vehicle and/or does not utilize the vehicle data bus 112.

The vehicle telematics device 110 can include any of a variety of sensors and/or devices, including those described herein with respect to the vehicle data bus and any described in more detail herein, to obtain data regarding the status of the vehicle. The vehicle telematics device 110 can also communicate with any of a variety of sensors and/or devices using the I/O interface 114. The I/O interface 114 can be any connection, including wired and wireless connections, as appropriate to the requirements of specific applications of embodiments. In several embodiments, the vehicle telematics device 110 can execute scripts to read data and/or perform particular processes. These scripts can be pre-loaded on the device and/or obtained from the remote server system 130, vehicle data bus 112, and/or the I/O interface 114 as appropriate to the requirements of specific applications of embodiments. The vehicle telematics device 110 can be self-powered and/or connected into the electrical system of the vehicle in which the vehicle telematics device 110 is installed. In a variety of embodiments, the vehicle telematics device is powered via the vehicle data bus 112 and/or the I/O interface 114. In many embodiments, the vehicle telematics device 110 utilizes a Global Positioning System (GPS) receiver in order to determine the location, speed, and/or acceleration of the vehicle. In several embodiments, the vehicle telematics device 110 obtains location data from the mobile communications device 116. However, it should be noted that any location-determining techniques, such as cellular tower triangulation, wireless network geolocation techniques, and dead reckoning techniques, could be utilized as appropriate to the requirements of specific applications of embodiments.

In a variety of embodiments, the vehicle telematics device 110, mobile communication device 116, and/or remote server system 130 provides a user interface allowing for visualizing and interacting with the data transmitted and/or received between the systems. In several embodiments, the vehicle telematics device 110, mobile communications device 116, and/or remote server system 130 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications.

Although a specific architecture of a vehicle telematics system in accordance with embodiments are discussed with reference to FIG. 1, a variety of architectures, including sensors and other devices and techniques not specifically described herein, can be utilized in accordance with embodiments. Furthermore, the processes described herein can be performed using any combination the vehicle telematics device, mobile communications device, and/or the remote server systems as appropriate to the requirements of specific applications of embodiments.

Vehicle Telematics Devices

Figure 2A:
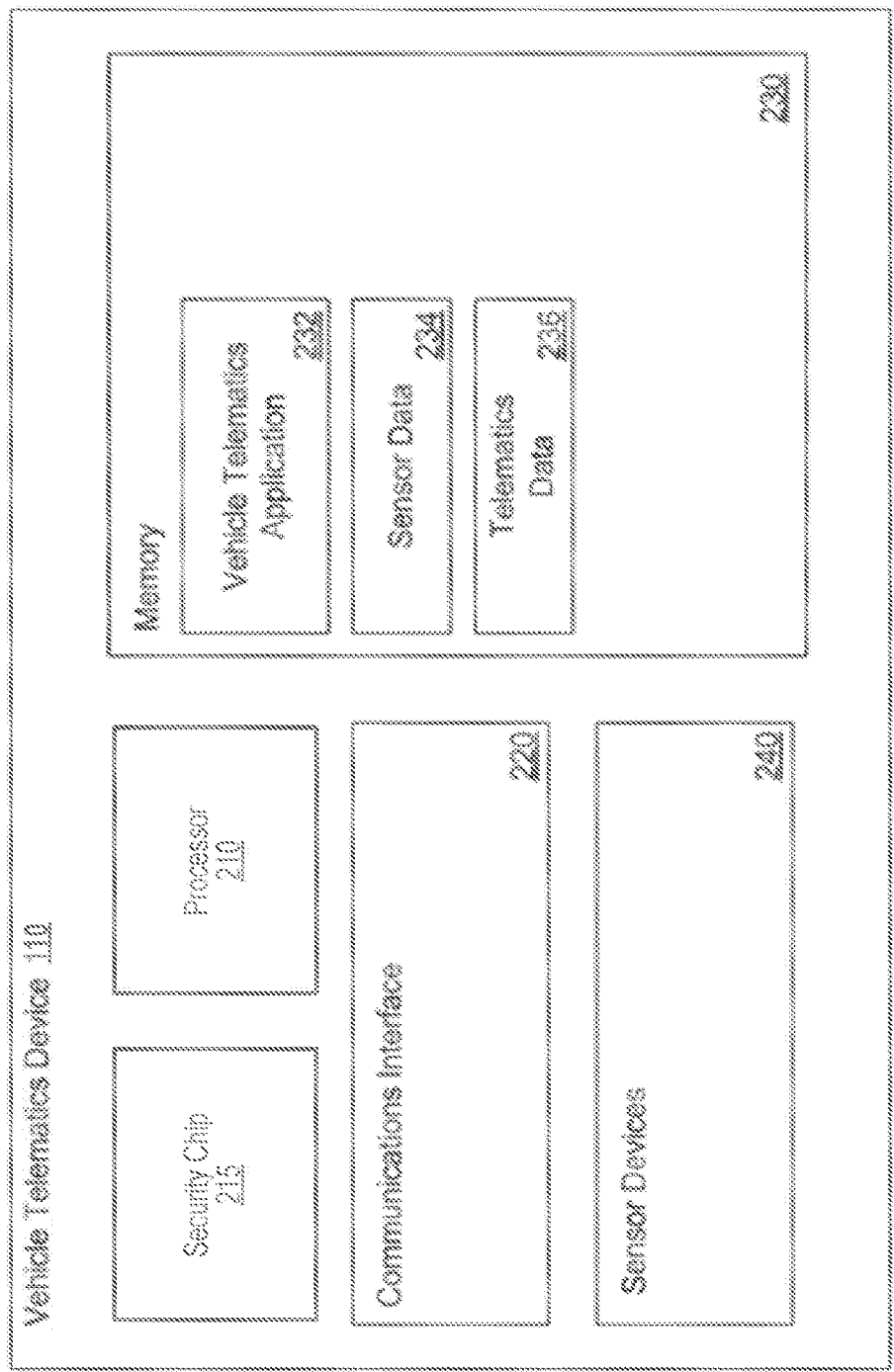
FIG. 2A is a conceptual illustration of a vehicle telematics device in accordance with an embodiment.

Vehicle telematics devices in accordance with embodiments can transmit and receive data via a mobile communications device. A conceptual illustration of a vehicle telematics device in accordance with an embodiment is shown in FIG. 2A. The vehicle telematics device 110 includes a processor 210 and a security chip 215 in communication with memory 230. The vehicle telematics device 110 can also include one or more communication interfaces 220 capable of sending and receiving data. In a number of embodiments, the communication interface 220 is in communication with the processor 210, the security chip 215, the memory 230, and/or the sensor device(s) 240. In several embodiments, the memory 230 is any form of storage configured to store a variety of data, including, but not limited to, a vehicle telematics application 232, sensor data 234, and telematics data 236. In many embodiments, the vehicle telematics application 232, sensor data 234, and/or telematics data 236 are stored using an external server system and received by the vehicle telematics device 110 using the communications interface 220.

Sensor devices 240 can include RPM sensors, voltage sensors, GPS receivers, noise sensors, vibration sensors, acceleration sensors, weight sensors, and any other device capable of measuring data regarding a vehicle as appropriate to the requirements of specific applications of embodiments. Sensor devices 240 can be included within the vehicle telematics device 110 and/or located external to the vehicle telematics device 110. The vehicle telematics device 110 can communicate with external sensor devices using the communications interface 220, such as via a vehicle data bus, I/O interface (including serial interfaces), mobile communications device 116, and/or a network connection as appropriate to the requirements of specific applications of embodiments. In a variety of embodiments, the vehicle telematics device 110 is connected to a diagnostic connector (e.g., an OBD II port) in a vehicle. The vehicle telematics device 110 can also communicate with the remote server system 130 through the communications interface 220 and a mobile communications device 116 over the network 120.

Figure 2B:
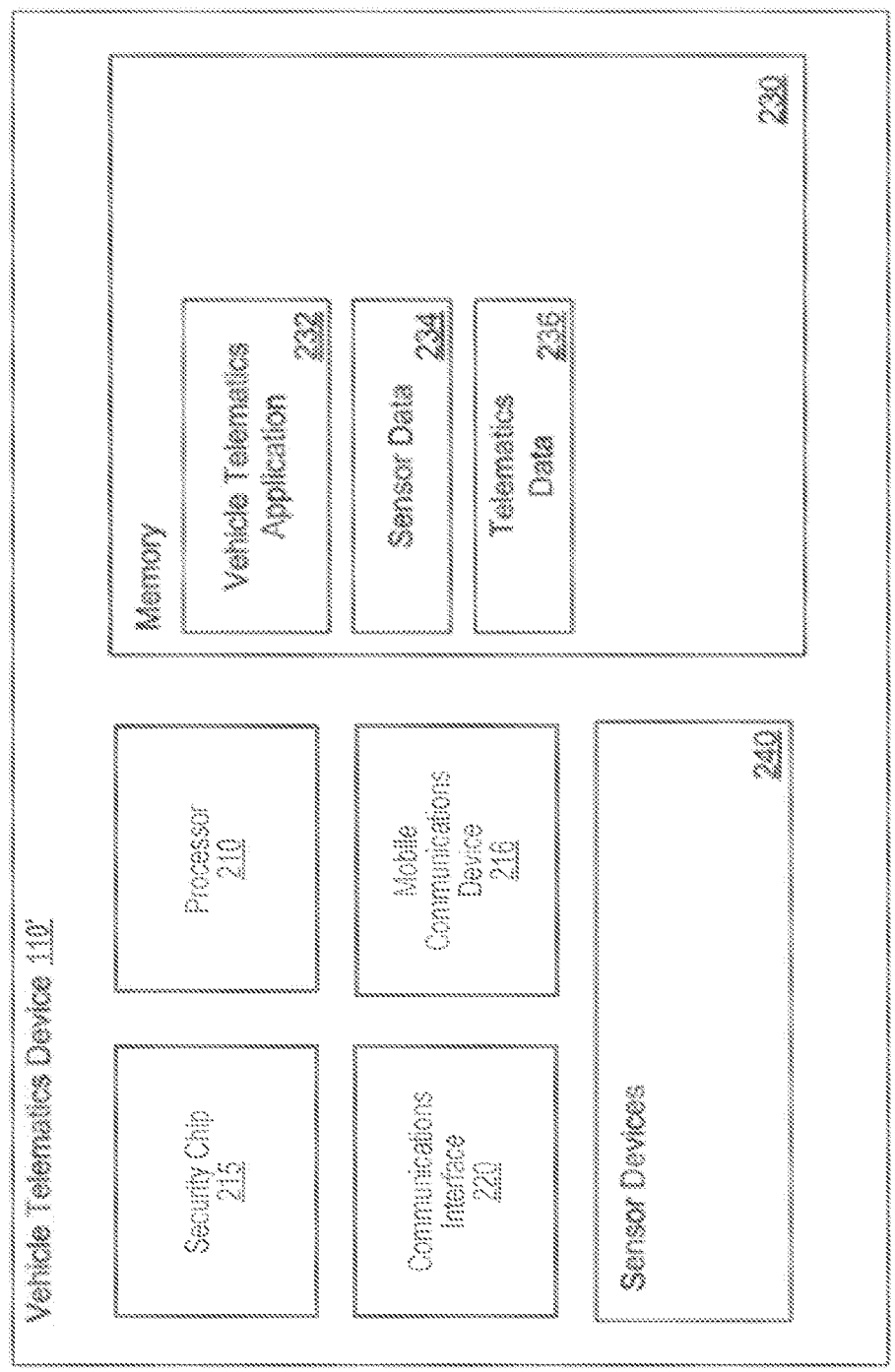
FIG. 2B is a conceptual illustration of another vehicle telematics device in accordance with an embodiment.

FIG. 2B is a conceptual illustration of the vehicle telematics device 110' in accordance with an embodiment. The vehicle telematics device 110' includes the mobile communications device 116 coupled to the communications interface 220 to communicate with the remote server system 130 over the network 120.

The vehicle telematics application 232 can direct the processor 210 and/or the security chip 215 to perform a variety of secure communication processes, a number of which that can be performed in accordance with embodiments further described herein.

Although specific architectures for vehicle telematics devices in accordance with embodiments are conceptually illustrated in FIG. 2A, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Secure Communications

Figure 3:
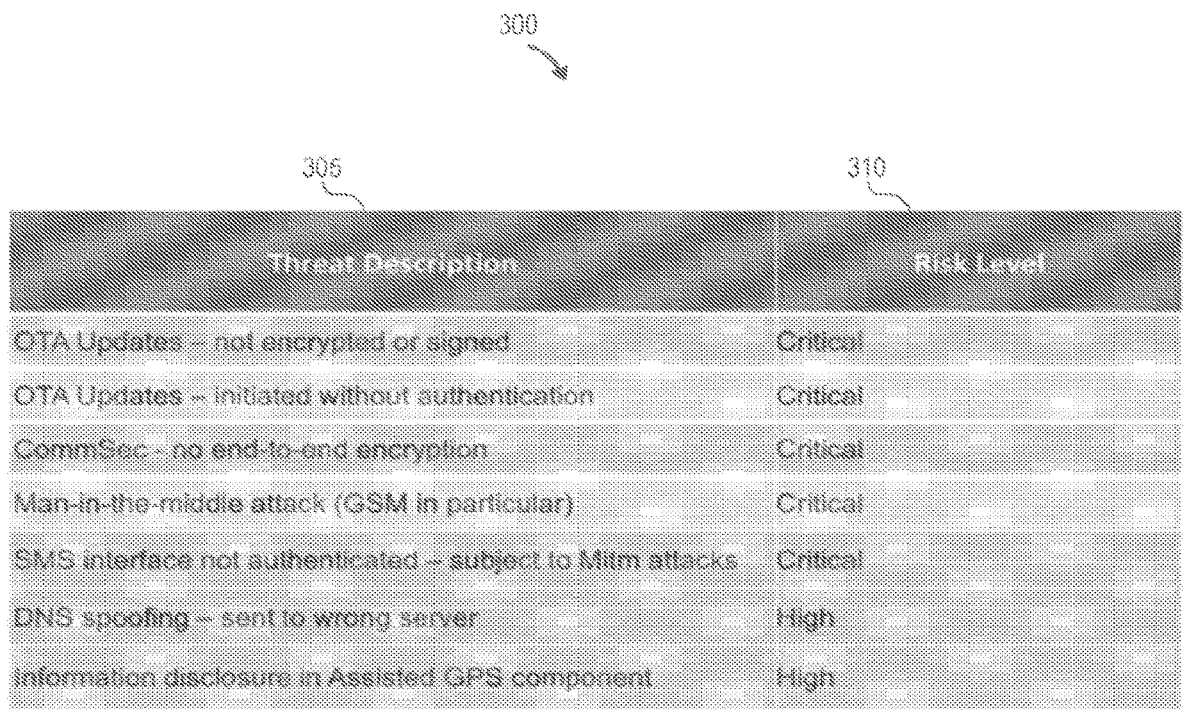
FIG. 3 is a chart showing example threat descriptions and corresponding security risk levels.

FIG. 3 is a chart 300 showing example threat descriptions 305 and corresponding security risk levels 310. Example threat descriptions 305 having a security risk level 310 of "critical" include at least the following: Over-the-Air (OTA) updates that are not encrypted or signed, OTA updates that are initiated without authentication, communications security (COMSEC) having no end-to-end encryption, man-in-the-middle (MITM) attack (especially on Global System for Mobile Communications (GSM)), and a Short Message Service SMS) interface that is not authenticated (e.g., subject to MITM attacks).

Example threat descriptions 305 having a security risk level 310 of "high" include at least the following: Domain Name System (DNS) spoofing (e.g., communication sent to wrong server) and information disclosure in an Assisted Global Positioning System (A-GPS) component. The vehicle telematics system 100 may undergo other threats not shown in FIG. 3.

In the vehicle telematics system 100 of FIG. 1, a primary security threat is remote access by an external computing device. For example, an external computing device might attack the vehicle telematic system 100 according to one of the threat descriptions 305 listed in FIG. 3. There are at least three levels of security protection to address a primary threat: existing security (e.g., readily available or base level security), Level-1 security (e.g., enhanced access protection), and level-2 security (e.g., full Transport Layer Security (TLS)). A secondary (non-primary) threat is physical access to the vehicle telematics system 100.

Figure 4:
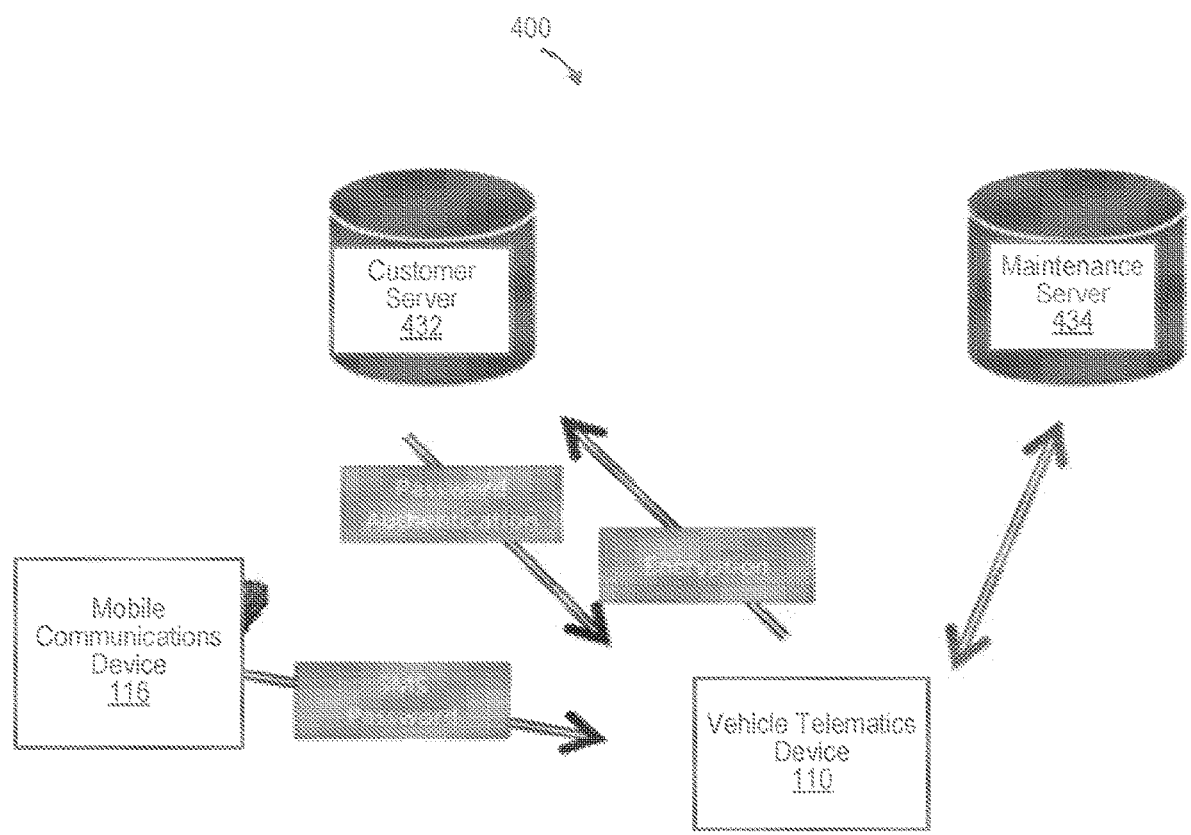
FIG. 4 is a conceptual block diagram of a vehicle telematics system having existing security (e.g., base level security).

FIG. 4 is a conceptual block diagram of a vehicle telematics system 400 having existing security (e.g., base level security). The vehicle telematics device 110 can communicate with a maintenance server 434, a customer server 432, and/or the mobile communications device 116. The communication by the vehicle telematics device 110 with servers or other devices can be performed with various protocols, such as transmission control protocol (TCP)/internet protocol (IP) and/or user datagram protocol (UDP)/internet protocol (IP) for example.

The vehicle telematics device 110 sends inbound encrypted data to a customer server 432. The inbound encryption provides intercept protection (e.g., protection from an interception attack) on data generated by the vehicle telematics device 110. The vehicle telematics device 110 and/or the customer server 432 stores a cryptographic key (e.g., public encryption key and/or private decryption key) as a configuration parameter.

The customer server 432 sends password authentication to access the vehicle telematics device 110. The password authentication provides remote access protection (e.g., protection from a remote access attack). The vehicle telematics device 110 and/or the customer server 432 stores password authentication as a configuration parameter.

The mobile communications device 116 sends an SMS password to the vehicle telematics device. The SMS password provides remote access protection (e.g., protection from a remote access attack). The vehicle telematics device 110 and/or the mobile communications device 116 stores SMS password authentication as a configuration parameter.

The vehicle telematics device can receive an attention (AT) command password from a local device (e.g., local terminal program). The AT command password provides local access protection (e.g., protection from a malicious user). The AT command password is typically the same password as the SMS password.

Figure 5:
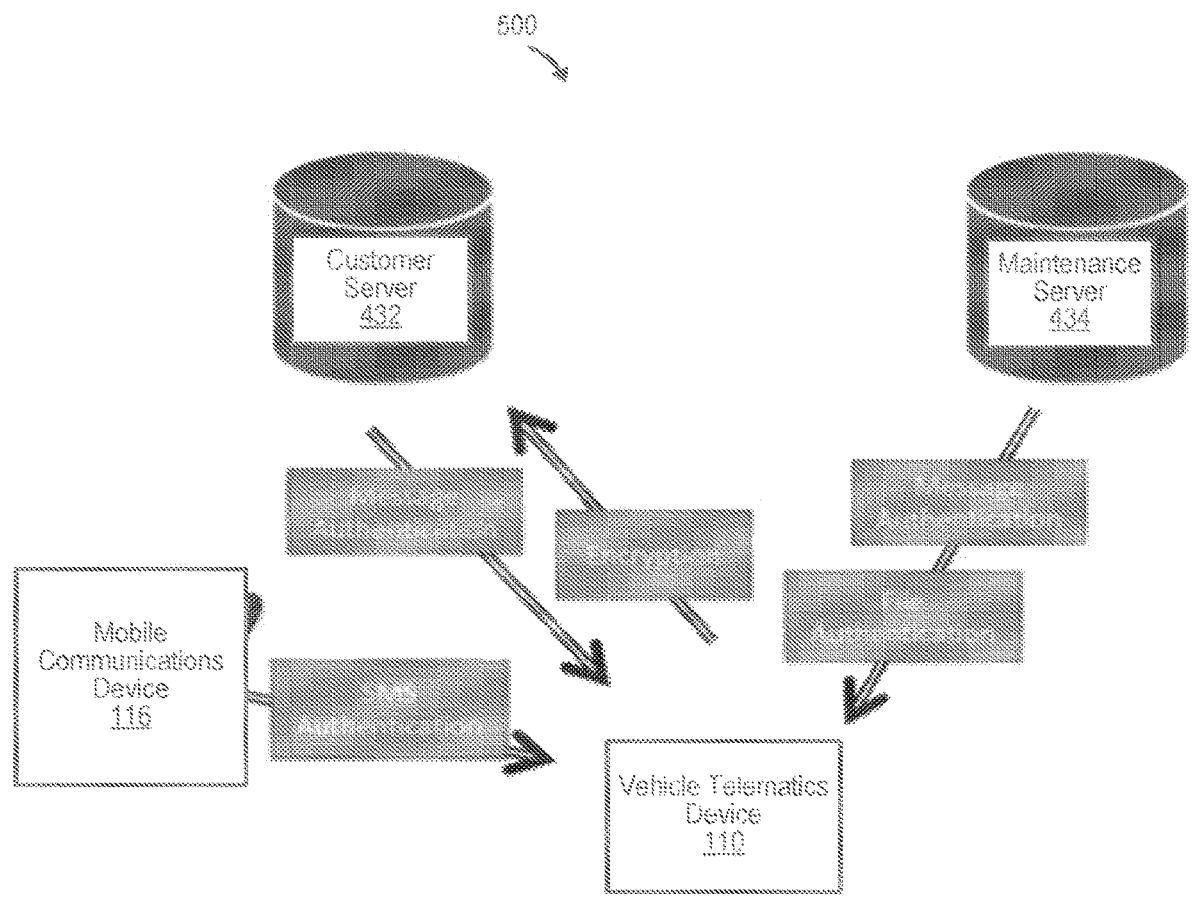
FIG. 5 is a conceptual block diagram of a vehicle telematics system having Level-1 security (e.g., enhanced access protection).

FIG. 5 is a conceptual block diagram of a vehicle telematics system 500 having Level-1 security (e.g., enhanced access protection). The vehicle telematics device 110 can communicate with the Maintenance server 434, the customer server 432, and/or the mobile communications device 116.

The vehicle telematics device 110 can send an encrypted inbound message to a customer server 432. The encryption provides intercept protection (e.g., protection from an interception attack) on data generated by the vehicle telematics device 110. The vehicle telematics device 110 and/or the customer server 432 stores cryptographic keys and settings as configuration parameters. To the portions of an inbound message, the vehicle telematics device 110 can apply the encryption to the payload and vehicle identification number (VIN) in an option header. A cryptographic key is based on a proprietary stream cipher. The vehicle telematics device 110 typically does not apply encryption to the maintenance server interface.

The customer server 432 can send authenticated outbound messages to one or more vehicle telematics devices 110. The outbound authentication protects authenticity and integrity of messages that the customer server 432 sends to the vehicle telematics devices 110. To authenticate an outbound message, the sender (e.g., customer server 432) calculates a digital signature of the message combined with a secret key. The authentication code or signature is calculated by using the entire message (e.g., options, header, payload, etc.), To authenticate outgoing messages, the customer server 432 can use, for example, keyed-hash message authentication code Merkle-Damgård hash function 5 (HMAC-MD5), 16-byte digest. The secret authentication keys used in the message authentication are unique to each vehicle telematics device 110 and each interface (e.g., inbound interface, maintenance interface at the vehicle telematics device 110, etc.). The sender (e.g., customer server 432) sends the signature along with the message. The receiver (e.g., vehicle telematics device 110) of the message authenticates the message by verifying the digital signature that is sent with the message matches a signature that the receiver calculates by using the received message combined with the secret key.

The maintenance server 434 and/or the customer support server 432 can authenticate files transmitted to one or more vehicle telematics devices 110. The file authentication provides file tampering protection by validating authenticity and integrity of files using a digital signature of the file transmitted along with the file. The maintenance server 434 and/or the customer support server 432 applies file authentication to all files transmitted to the vehicle telematics device 110. The maintenance server 434 and/or the customer support server 432 supports the file authentication protocol. To authenticate files, the maintenance server 434 can use, for example, an RSA Security/Secure Hash Algorithm two hundred and fitly-six (RSA/SHA-256) digital signature algorithm. The cryptographic keys used by the vehicle telematics device 110 to validate the digital signature of the file can be embedded in the software code of the vehicle telematics device 110.

The mobile communications device 116 can authenticate SMS messages for transmission to the vehicle telematics device 110. The SMS authentication provides remote access protection (e.g., protection from a remote access attack). The mobile communications device 116 and the vehicle telematics device 110 can handle the SMS authentication. In one embodiment, SMS authentication is substantially the same as message authentication (e.g., HMAC-MD5), which is discussed with reference to FIGS. 4 and 5. Accordingly, the SMS authentication includes use of a cryptographic key that is similar to a cryptographic key used in message authentication. SMS authentication can complicate SMS access at the mobile communications device 116 and/or the vehicle telematics device 110. Accordingly, a software application to handle SMS authentication may be required to be loaded onto the mobile communications device 116 and onto the vehicle telematics device 110.

The customer server 432 can generate authentication keys from a seed (e.g., some non-secret value) and an electronic serial number (ESN) of the vehicle telematics device 110. For example, the customer server 432 can provide and manage a seed and an authentication key for each for each vehicle telematics device 110. Each vehicle telematics device 110 can generate a seed and an authentication key for each interface at the vehicle telematics device 110.

In one embodiment, protection can be enabled remotely but cannot be disabled remotely. For example, the mobile communications device 116, the customer server 432, and/or the maintenance server 434 can remotely enable protected communication with the vehicle telematics device 110. However, neither the mobile communications device 116, the customer server 432, nor the maintenance server 434 can remotely disable protected communication with the vehicle telematics device 110.

Figure 6:
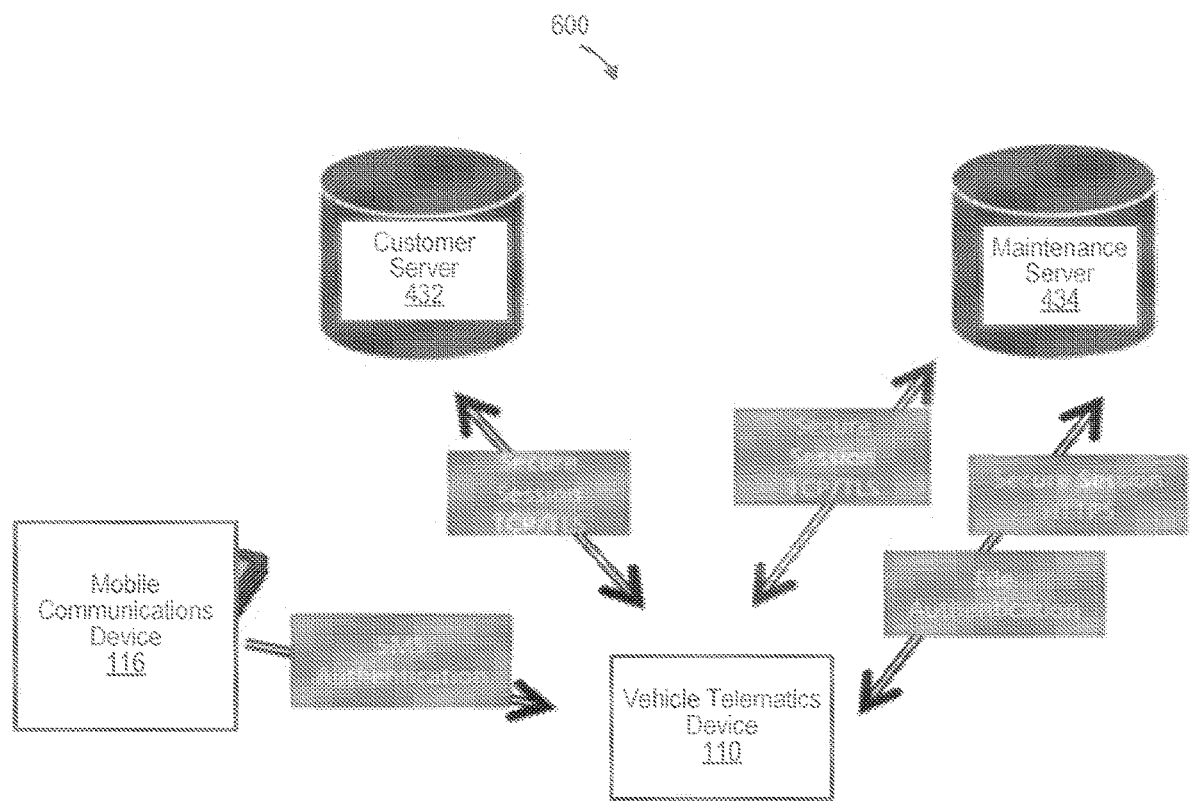
FIG. 6 is a conceptual block diagram of a vehicle telematics system having level-2 security (e.g., full TLS).

FIG. 6 is a conceptual block diagram of a vehicle telematics system 600 having level-2 security (e.g., full TLS). The vehicle telematics device 110 can communicate with the maintenance server 434, the customer server 432, and/or the mobile communications device 116.

The customer server 432 and/or the maintenance server 434 can communicate (e.g., transmit data) with the vehicle telematics device 110 via transmission control protocol (TCP)/transport layer security (TLS) session security. For example, the devices of the vehicle telematics system 600 can support TLS for TCP and hypertext transfer protocol (HTTP). The devices of the vehicle telematics system 600 do not have user datagram protocol (UDP) support. The TCP/TLS session security provides protection via authentication and encryption. The vehicle telematics system 600 applies the TCP/TLS session security to all Internet protocol (IP) interfaces (e.g., inbound interface, maintenance interface, etc.). The TCP/TLS session security uses public-key cryptography with public key infrastructure (PKI) certificates.

Like Level-1 security of FIG. 4, the maintenance server 434 and/or the customer support server 432 in FIG. 5 can also authenticate files transmitted to one or more vehicle telematics devices 110. The file authentication provides file tampering protection by validating authenticity and integrity of files using a digital signature of the file transmitted along with the file. The maintenance server 434 and/or the customer support server 432 applies file authentication to all files transmitted to the vehicle telematics device 110. The maintenance server 434 and/or the customer support server 432 supports the file authentication protocol. To authenticate files, the maintenance server 434 can use a digital signature algorithm, for example, an RSA Security/Secure Hash Algorithm two hundred and fifty-six (RSA/SHA-256) digital signature algorithm. The cryptographic keys used by the vehicle telematics device 110 to validate the digital signature of the file can be embedded in the software code of the vehicle telematics device 110.

Like Level-1 security of FIG. 4, the mobile communications device 116 in FIG. 5 can also authenticate SMS messages for transmission to the vehicle telematics device 110. The SMS authentication provides remote access protection (e.g., protection from a remote access attack). In one embodiment, SMS authentication is substantially the same as message authentication (e.g., HMAC-MD5), which is discussed with reference to FIGS. 4 and 5.

Figure 7:
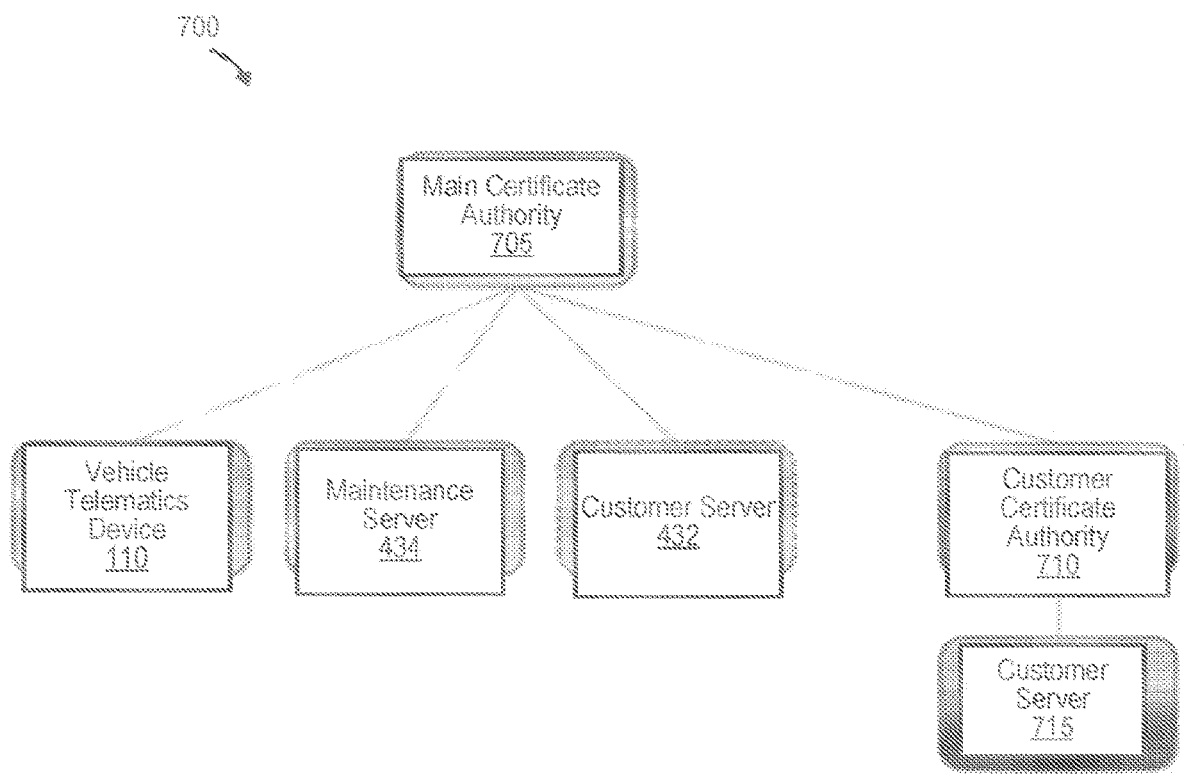
FIG. 7 is a tree diagram showing a public key infrastructure (PKI) for the vehicle telematics system, which has level-2 security.

FIG. 7 is a tree diagram showing a public key infrastructure (PKI) 700 for the vehicle telematics system 600, which has level-2 security. The PKI 700 shows how the vehicle telematics system 600 of FIG. 6 manages security certificates. A certificate authority or certification authority (CA) is a third-party computing device that issues digital certificates. A digital certificate certifies the ownership of a public encryption key by the named subject of the certificate. This allows other parties to rely upon signatures or on assertions made about the private decryption key that corresponds to the certified public encryption key. A certificate authority acts as a trusted third party that is trusted both by the subject (owner) of the certificate and by the party relying upon the certificate.

A main certificate authority 705 signs end-point certificate authority certificates for the vehicle telematics system 600, including one or more mobile telematics devices 110, the maintenance server 434, the customer server 432, and another customer server 715. The main certificate authority 705 signs a customer certificate authority 710 for the customer server 715. Computing devices in the telematics system 600 exchange certificate authority certificates during TLS session negotiations. Computing devices in the telematics system 600 can install device certificates and/or certificate authority certificates by using, for example, authenticate-then-encrypt (AtE).

Figure 8:
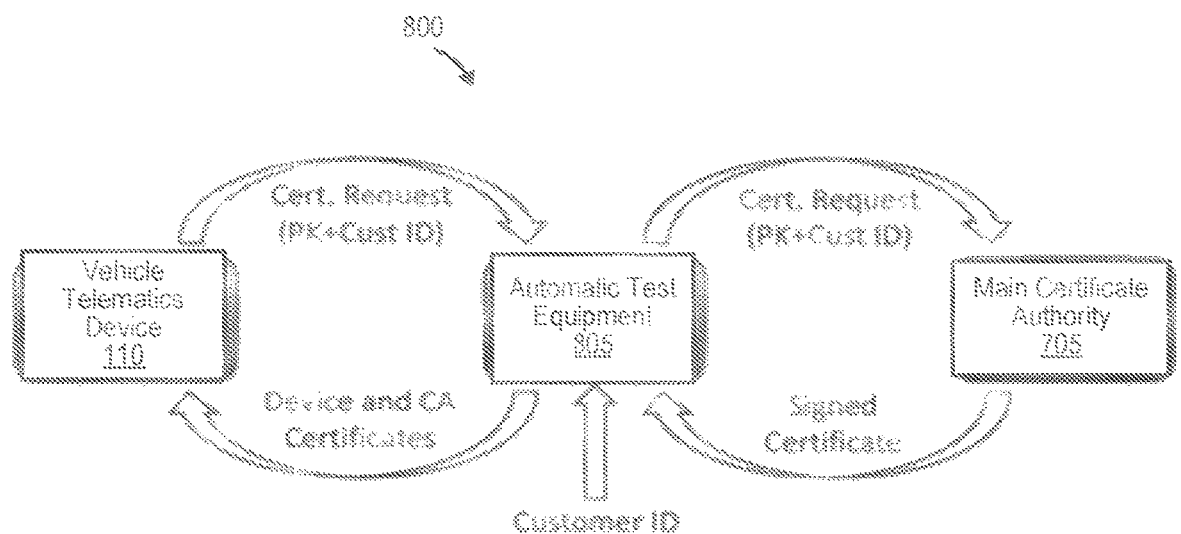
FIG. 8 is a conceptual block diagram of a system for provisioning a vehicle telematics system having level-2 security.

FIG. 8 is a conceptual block diagram of a system 800 for provisioning a vehicle telematics system 600 having level-2 security. The system includes, without limitation, automatic test equipment (ATE) 805, a vehicle telematics device 110, and a main certificate authority 705. The system 800 typically performs provisioning in, for example, a factory and offline from the vehicle telematics system 600.

The vehicle telematics device 110 uses the security chip 215 to generate a public-private cryptographic key pair. The vehicle telematics device 110 can securely store the private cryptographic key. The vehicle telematics device 110 combines a customer identity provided by the ATE 805 with the public cryptographic key to generate a certificate signing request (CSR) for the vehicle telematics device 110. The customer identity is optional security that ensures the vehicle telematics device 110 will only connect with the correct customer server 715. The ATE 805 passes the CSR to the main certificate authority 705. The main certificate authority 705 signs the authentication certificate. Onto the vehicle telematics device 110, the system 800 loads (1) the signed authentication certificate for the telematics device 110 and (2) a copy of the certificate authority's own certificate or certificates signed by the main certificate authority 705. The vehicle telematics device 110 securely stores the signed authentication certificates in the security chip 215.

FIG. 9 is a chart 900 showing example mitigation techniques 905 for various threat descriptions 305 and corresponding security risk levels 310. The threat descriptions 305 and corresponding security risk levels 310 are discussed with reference to FIG. 3. The vehicle telematics system 100 may undergo other threats not shown in FIG. 9. To mitigate Over-the-Air (OTA) updates that are not encrypted or signed, the vehicle telematics system 100 may include file authentication (e.g., level-1 security and level-2 security). To mitigate OTA updates that are initiated without authentication, the vehicle telematics system 100 may include direct message authentication (e.g., level-1 security and level-2 security). To mitigate communications security (COMSEC) having no end-to-end encryption, the vehicle telematics system 100 may encrypt data at the vehicle telematics device 110 (e.g., base level security and level-1 security). The vehicle telematics system 100 may alternatively encrypt data at all end points, including the vehicle telematics device 110, the customer server 432, and the maintenance server 434 (e.g., level-2 security). To mitigate man-in-the-middle (MITM) attack (especially on Global System for Mobile Communications (GSM)), the vehicle telematics system 100 may include direct message authentication, file authentication, message encryption, and file encryption (e.g., level-1 security and level-2 security). To mitigate Short Message Service (SMS) interface that is not authenticated (e.g., subject to MITM attacks), the vehicle telematics system 100 may SMS authentication (e.g., level-1 security and level-2 security). To mitigate Domain Name System (DNS) spoofing (e.g., communication sent to wrong server), the vehicle telematics system 100 may include server authentication (e.g., level-2 security). To mitigate information disclosure in an Assisted Global Positioning System (A-GPS) component, the vehicle telematics system 100 may randomize the GPS position in an AGPS request associated with the vehicle telematics device 110.

Practical Implementation Considerations

Level-2 TLS requires some important implementation considerations. Operations of a TLS stack require additional and sufficient memory resources (e.g., 30 kilobytes of RAM, 100 kilobytes of flash memory). A security stack is a group of software/firmware programs that work in tandem to produce a result or achieve a common goal (e.g., a goal of configuring a processor to carry out security operations). Sufficient memory for a TLS stack is unavailable in typical commercial products (e.g., typical vehicle telematics devices).

In one embodiment, a vehicle telematics device requires the addition of hardware, such as security chip 215 of FIG. 2A. The security chip 215 may be included on an add-on security processor board and is enabled to support a security stack (e.g., TLS stack). Alternatively, a security stack can be integrated into the processor 210.

In one embodiment, the processor 210 is upgraded to have more RAM and more hardware cryptography support. One convenient solution is for the processor 210 to be a drop-in replacement for a processor that may presently be on a vehicle telematics device. With sufficient modification to the processor 210, there may not be a need for the separate security chip 215.

In one embodiment, the vehicle telematics device 110 can use a cellular radio Secure Socket interface (e.g., HTTPS). This embodiment is dependent on which cellular radios and which radio firmware (e.g., which type of mobile communications device 116) are deployed in the vehicle telematics device 110. This embodiment is limited to cellular-only solutions without a dial-up network (DUN) (e.g., mobile data terminal (MDT) interface).

In one embodiment, the hardware security chip 215 supports cryptographic key generation. Accordingly, private encryption key insertion into the vehicle telematics device 110 is not required to take place offline at the factory (e.g., not required to take place online while the vehicle telematic system 100 is active). The security chip 215 can support secure storage of cryptographic keys and authentication certificates.

In one embodiment, the vehicle telematics device 110 includes hardware to support Bluetooth Low Energy (BLE) radio. Bluetooth communication capability enables the telematics device 110 to communicate with other devices (e.g., mobile communications device 116) via the Bluetooth wireless technology standard.

In one embodiment, the vehicle telematics device 110 includes level-3 physical security to protect against physical attacks. For example, the vehicle telematics device 110 may include at least one of the following: read-out protection, secure boot for authentication of a run-time image, adding authentication to the attention command (ATCmd) interface, and/or encrypting data stored on an external memory device (e.g., flash memory coupled to the serial peripheral interface (SPI) bus).

OTHER EMBODIMENTS

Although the embodiments have been described in certain specific aspects, many additional modifications and variations would be apparent to those skilled in the art. In particular, any of the various processes described herein can be performed in alternative sequences and/or in parallel (on the same or on different computing devices) in order to achieve similar results in a manner that is more appropriate to the requirements of a specific application. It is therefore to be understood that the embodiments can be practiced otherwise than specifically described without departing from the scope and spirit. Thus, the embodiments should be considered in all respects as illustrative and not restrictive. It will be evident to the person skilled in the art to freely combine several or all of the embodiments discussed here as deemed suitable for a specific application. Throughout this disclosure, terms like "advantageous", "exemplary" or "preferred" indicate elements or dimensions that are particularly suitable (but not essential) to an embodiment, and that may be modified wherever deemed suitable by the skilled person, except where expressly required.

While certain exemplary embodiments have been described and shown in the accompanying drawings, it is to be understood that such embodiments are merely illustrative of and not restrictive on the broad disclosure, and that the embodiments not be limited to the specific constructions and arrangements shown and described, since various other modifications may occur to those ordinarily skilled in the art.

When implemented in software, the elements of the embodiments are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

CONCLUSION

While this specification includes many specifics, these should not be construed as limitations on the scope of the disclosure or of what may be claimed, but rather as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations, separately or in sub-combination. Moreover, although features may be described herein as acting in certain combinations and even initially claimed as such, one or more features from a claimed combination may in some cases be excised from the combination, and the claimed combination may be directed to a sub-combination or variations of a sub-combination. While embodiments have been particularly described, they should not be construed as limited by such embodiments, but rather construed according to the claims included herein.

What is claimed is:

1. A vehicle telematics device, comprising:
   a processor;
   a memory coupled to the processor and storing a vehicle telematics application;
   a security chip coupled to the processor and the memory, wherein the security chip has stored therein a private cryptographic key and an authentication certificate for the vehicle telematics device signed by a certificate authority and including a public cryptographic key corresponding to the private cryptographic key, wherein the security chip is configured to support a Transport Layer Security (TLS) stack; and
   a connector configured to (i) mate with a vehicle diagnostic connector of a vehicle, (ii) receive sensor data related to a characteristic of the vehicle over a vehicle data bus of the vehicle, and (iii) receive primary power for the vehicle telematics device from a vehicle power system of the vehicle,
   wherein the security chip is further configured to encrypt the sensor data using the private cryptographic key, establish a Transmission Control Protocol (TCP)/Transport Layer Security (TLS) security session with a customer server using the authentication certificate, and transmit the encrypted sensor data to the customer server using the TCP/TLS security session, and
   wherein the memory is sufficient to handle operations of the Transport Layer Security (TLS) stack, the memory including at least 30 kilobytes of random access memory (RAM) and 100 kilobytes of flash memory.

2. The vehicle telematics device of claim 1, wherein:
   the security chip is configured to generate the private and public cryptographic keys and store the private key in the secure storage.

3. The vehicle telematics device of claim 1, wherein the connector is configured to receive the sensor data from one or more sensor devices of the vehicle via the vehicle data bus.

4. The vehicle telematics device of claim 1, wherein:
   the vehicle telematics device is further configured to communicate with a mobile communications device; and the security chip is further configured to apply Short Message Service (SMS) authentication via challenge-response authentication with the mobile communications device.

5. The vehicle telematics device of claim 1, wherein:
the vehicle telematics device is further configured to communicate with a maintenance server; and
the security chip is further configured to transmit encrypted data to the maintenance server via a Transmission Control Protocol (TCP)/Transport Layer Security (TLS) security session.

6. The vehicle telematics device of claim 1, wherein:
the vehicle telematics device is further configured to communicate with the certificate authority; and
the security chip is configured to receive the authentication certificate signed by the certificate authority from the certificate authority.

7. A vehicle telematics system, comprising:
a vehicle having a vehicle diagnostic connector connected to a vehicle data bus and a plurality of vehicle sensors coupled to the vehicle data bus, wherein each vehicle sensor is configured to produce sensor data related to a characteristic of the vehicle and provide the sensor data to the vehicle data bus;
a vehicle telematics device including:
  (i) a processor,
  (ii) a memory coupled to the processor and storing a vehicle telematics application,
  (iii) a security chip coupled to the processor and the memory, wherein the security chip has stored therein a private cryptographic key and an authentication certificate for the vehicle telematics device signed by a certificate authority and including a public cryptographic key corresponding to the private cryptographic key, wherein the security chip is configured to support a Transport Layer Security (TLS) stack, and
  (iv) a connector configured to mate with the vehicle diagnostic connector of the vehicle, receive the sensor data from the plurality of vehicle sensors over the vehicle data bus and receive primary power for the vehicle telematics device from a vehicle power system of the vehicle,
wherein the security chip is further configured to encrypt the sensor data using the private cryptographic key, establish a Transmission Control Protocol (TCP)/Transport Layer Security (TLS) security session with a customer server using the authentication certificate, and transmit the encrypted sensor data to the customer server using the TCP/TLS security session; and
wherein the memory is sufficient to handle operations of the Transport Layer Security (TLS) stack, the memory including at least 30 kilobytes of random access memory (RAM) and 100 kilobytes of flash memory.

8. The vehicle telematics system of claim 7, wherein:
the security chip is configured to generate the private and public cryptographic keys and store the private key in the secure storage.

9. The vehicle telematics system of claim 7, wherein:
the vehicle telematics device further includes one or more sensor devices capable of measuring sensor data regarding the vehicle and configured to store the sensor data in the memory.

10. The vehicle telematics system of claim 7, further comprising:
a mobile communications device in communication with the vehicle telematics device, wherein the security chip is further configured to apply Short Message Service (SMS) authentication via challenge-response authentication with the mobile communications device.

11. The vehicle telematics system of claim 7, further comprising:
a maintenance server in communication with the vehicle telematics device, wherein the security chip is further configured to transmit encrypted data to the maintenance server via a Transmission Control Protocol (TCP)/Transport Layer Security (TLS) security session.

12. The vehicle telematics system of claim 7, further comprising:
a certificate authority in communication with the vehicle telematics device, wherein the security chip is configured to receive the authentication certificate signed by the certificate authority from the certificate authority.

* * * * *